… … …

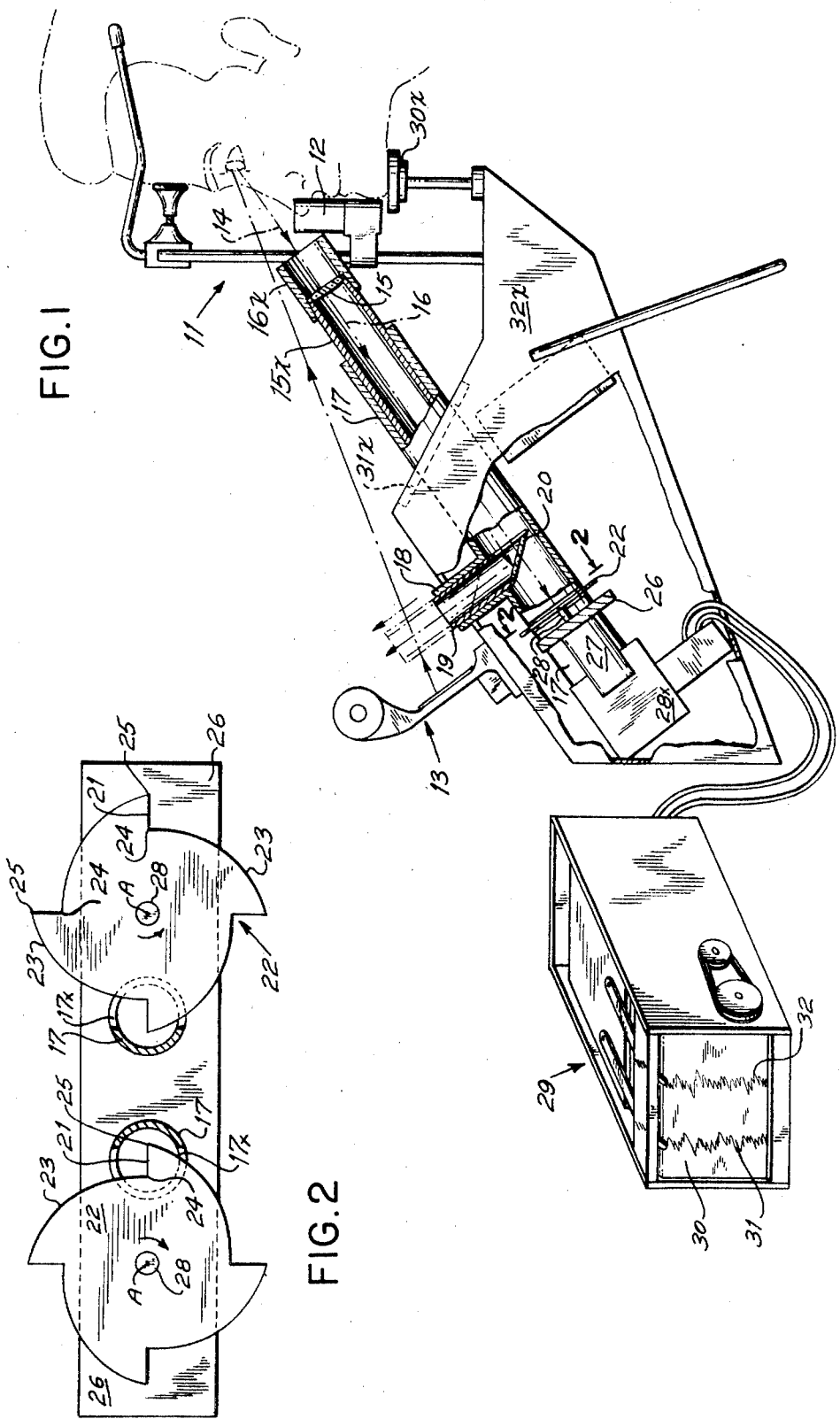

3,514,193
DEVICE FOR RECORDING EYE MOVEMENT
Siegfried Himmelmann, 3 Trent Lane,
Smithtown, N.Y. 11787
Filed Sept. 30, 1968, Ser. No. 763,899
Int. Cl. A61b *3/14*
U.S. Cl. 351—7          4 Claims

ABSTRACT OF THE DISCLOSURE

This invention relates to a device for recording the separate movements of each of two reading eyes. Light reflected from the eyeballs while reading, is reflected down separate telescopic tubes to respective photosensitive cells that convert the light pulses to voltage pulses. These light pulses are made by the light beams traveling down said telescopic tubes being intermittently intercepted by suitable serrations disposed in the edge of the respective rotating discs. The serrations on the edge of said discs give varying voltage corresponding to the duration of exposed light beam between adjacent serrations.

---

The prior art as set forth in the Taylor U.S. Pat. 3,196,453 uses a camera and film technique to record the movements of the eyes. Such a procedure is both cumbersome and time consuming in that liquid chemical developing solutions must be employed.

It is an object of this invention to provide a dry process for instantly recording eye movements on graphic tape.

It is another object to provide a novel apparatus whereby the reflected light from an eyeball is converted into voltage instantaneously and simultaneously recorded on moving tape to provide a permanent record of the subject's reading characteristics.

These and other objects of this invention will become apparent upon reading the following descriptive disclosure of an illustrative embodiment shown in the accompanying drawing in which:

FIG. 1 is a side view of the device, partly in section and broken away in part to show the interior construction thereof and FIG. 2 is a section view taken on line 2—2 of FIG. 1 showing the manner of intermittently intercepting the light path reflected from the eyeball by use of quadrant serrations disposed on the edge of a rotating disc.

In the conventional practice of obtaining the reading eye pattern or characteristics of a person or subject, a light beam is reflected from the cornea of the eyeball through a telescopic tube and lens therein as a narrow light beam upon a photographic moving film to obtain a permanent record as in the Taylor U.S. Pat. 3,196,453.

This invention uses the conventional apparatus for positioning the subject's head and for reflecting the light beam from the eyeball into a telescopic tube.

The demarkation from the prior art in this invention lies in the conversion of the movements of the telescope beam of light into electrical impulses to be recorded on moving graph paper in lieu of being recorded on moving photographic film to be subsequently developed in chemical solutions.

Turning to the drawing, a conventional head rest structure 11 is provided with a pair of conventional light sources 12, each having an opening therein to allow a spot of light to impinge upon a respective eyeball. This light beam is reflected from the eyeball while the subject reads material disposed on the lighted reading stand 13. This reflected light beam 14 is conducted through lens 15 which gathers it into a suitably narrow beam 16 in collimator 15X.

This invention in structure comprises a pair of relatively large diameter tubes 17, one for each eye, each having an integral smaller diameter tube 18 at a right angle thereto. A focusing tube 19 open at the top is slidably and frictionally disposed therein. The base of tube 19 is provided with a mirror 20 disposed at a suitable angle within the tube 17. The mirror 20 is provided with a pair of cross hairs so that the light beam 16 strikes the center of the cross mark.

The tube 19 is then removed and this light beam 16 now impinges at point 21 of a linear line of a rotatable disc 22.

The discs 22 are of identical construction and of predetermined configuration, being provided with four quadrant curves 23 which in sum constitute a unique periphery of four identical serrations. The curve 23 of each serration varies from a radius of a small circle, namely axis A to point 24, to a radius of a large circle, namely axis A to point 25.

The discs 22 rotate toward one another as shown by the arrows in FIG. 2. The speed of rotation of each disc 22 is identical. The discs 22 are synchronized to present a horizontal linear relationship to a pair of opposing linear edges 24 to 25, FIG. 2. Thus the light beams 16 emerge from behind both the respective linear edges 24 to 25 simultaneously for both discs 22.

As shown in FIG. 2, the tube 17 is provided with a suitably large slot 17X to accommodate the rotating serrations of disc 22. The discs 22 are made of suitable impregnated paper, plastic or other material.

To produce rotation of the disc 22, a flat plate 26 is provided with an aperture and mounted upon and fixedly secured as by set screws to tube 17. A conventional small electrical motor 27 is mounted to plate 26 alongside tube 17 and its axle 28 is secured to disc 22.

The light beam 16 from each eye is thus separately interrupted or cut off for varying time intervals as it moves horizontally in tube 17, depending upon whether the light beam 16 is closer to point 24 or further away from the axis A and nearer to point 25.

The pulses of light of varying duration formed by the separate discs 22 are fed into a conventional photomultiplier 28X disposed at the rear of tube 17 where the light pulses are converted into electrical pulses. These electrical pulses, as varying voltage reading, are fed into a conventional tape recorder 29 and recorded on a moving tape as lines 31 and 32, one for each eye.

In the operation of this device, the subject rests the chin on stand 30X. The tubes 17 are each disposed in a conventional swivel located in plate 31X secured to housing 32X. The tubes 17 are each independently swiveled to accommodate to the distance between the eyes of the child or adult subject and the focusing tube 16X is adjusted to collimate the reflected light from the eyeball into a narrow light beam 16.

What is claimed is:

1. In an optical device for recording reading eye movements having integrated housing means having a head rest, light emitting means and telescopic means for collimating reflected light from an eyeball to form a narrow beam; the improvement comprising tubular means of large diameter slidably mounted on said telescopic means and having a small diameter tube disposed at a right angle thereto near the base thereof, said tubular means having a radial slot adjacent the base thereof; positioning means slidably disposed in said small diameter tube for viewing said narrow light beam in said tubular means; a disc having a plurality of suitable serrations constituting the periphery thereof rotatably disposed in said slot with the serrations thereof intercepting said narrow light beam; electrical means for converting light pulses from said disc serrations into voltage pulses and electrical means for recording continuously and simultaneously said voltage pulses from each eye upon moving tape.

2. The device of claim 1 wherein the serrations are four quadrant serrations, each having a smooth curve line varying from a radius of a small inner circle to a radius of a large outer circle.

3. The device of claim 2 wherein said tubular means is provided with swivel means to aid in the adjustment to the eyes of the subject.

4. The device of claim 2 wherein said serrations are each provided with a linear edge forming a part of the radius of said large outer circle.

References Cited

UNITED STATES PATENTS

| | | | |
|---|---|---|---|
| 2,229,721 | 1/1941 | Brandt | 351—7 |
| 2,288,216 | 6/1942 | Tillyer | 351—7 |
| 3,196,453 | 7/1965 | Taylor | 351—7 |

OTHER REFERENCES

King, George: Recording Pupil Changes for Clinical Diagnosis, Electronics, vol. 32, No. 39, Sept. 25, 1959, pp. 67–69.

DAVID SCHONBERG, Primary Examiner

P. A. SACHER, Assistant Examiner